W. F. GREENLEE.
DISPLAY DEVICE.
APPLICATION FILED NOV. 24, 1919.
1,367,775.
Patented Feb. 8, 1921.
6 SHEETS—SHEET 3.
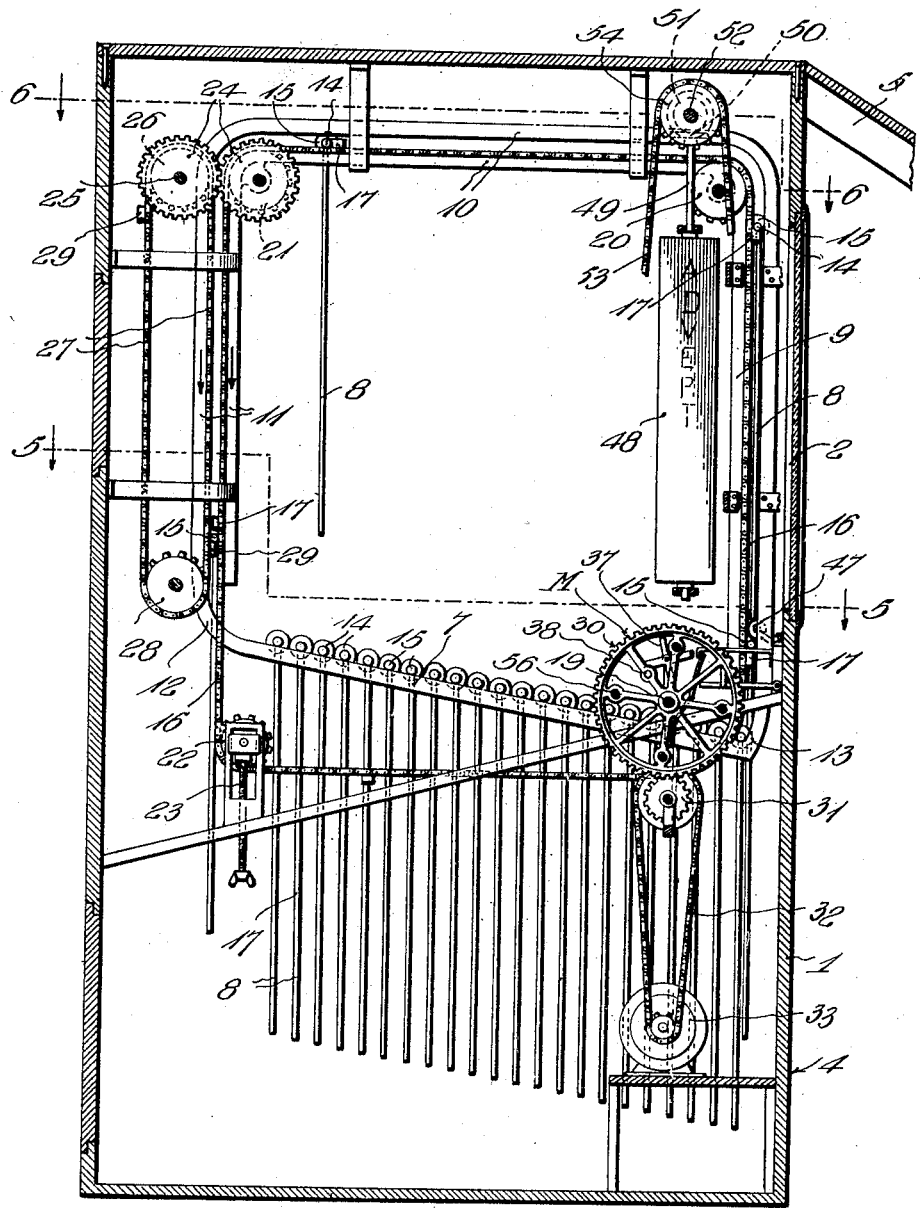
Inventor
William F. Greenlee
By H. B. Willson & Co.
Attorneys W. F. GREENLEE.
DISPLAY DEVICE.
APPLICATION FILED NOV. 24, 1919.
1,367,775.
Patented Feb. 8, 1921.
6 SHEETS—SHEET 4.
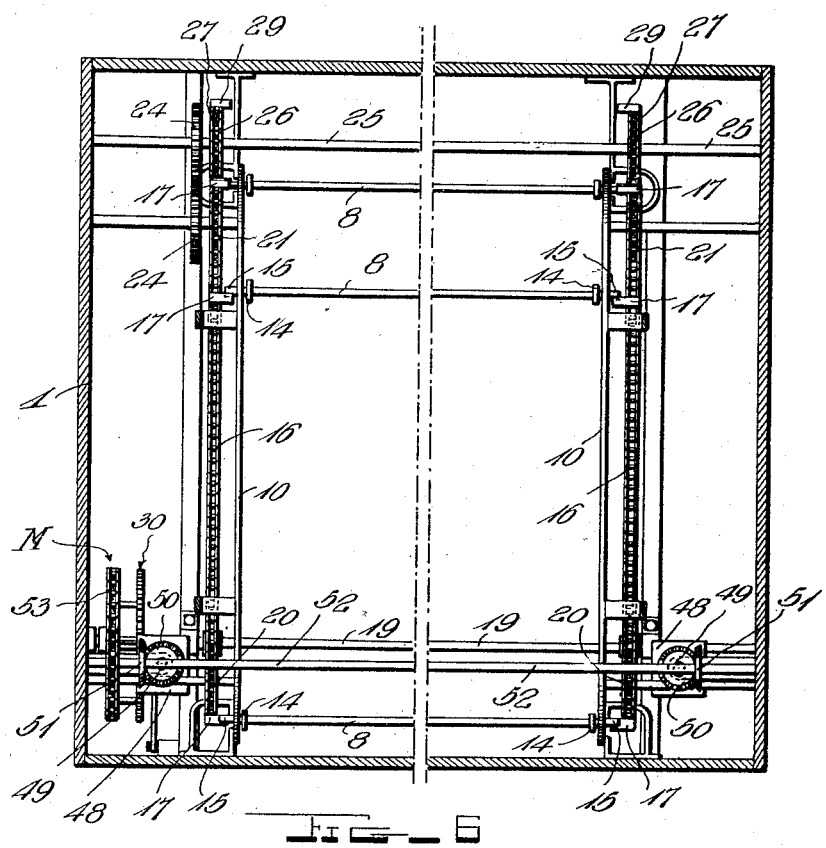
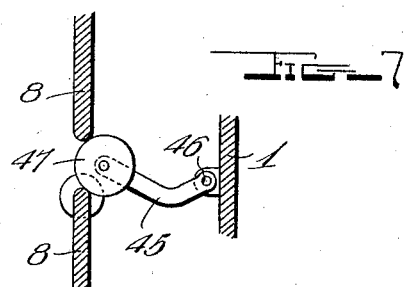
Inventor
William F. Greenlee
By H. B. Wilson &co.
Attorneys

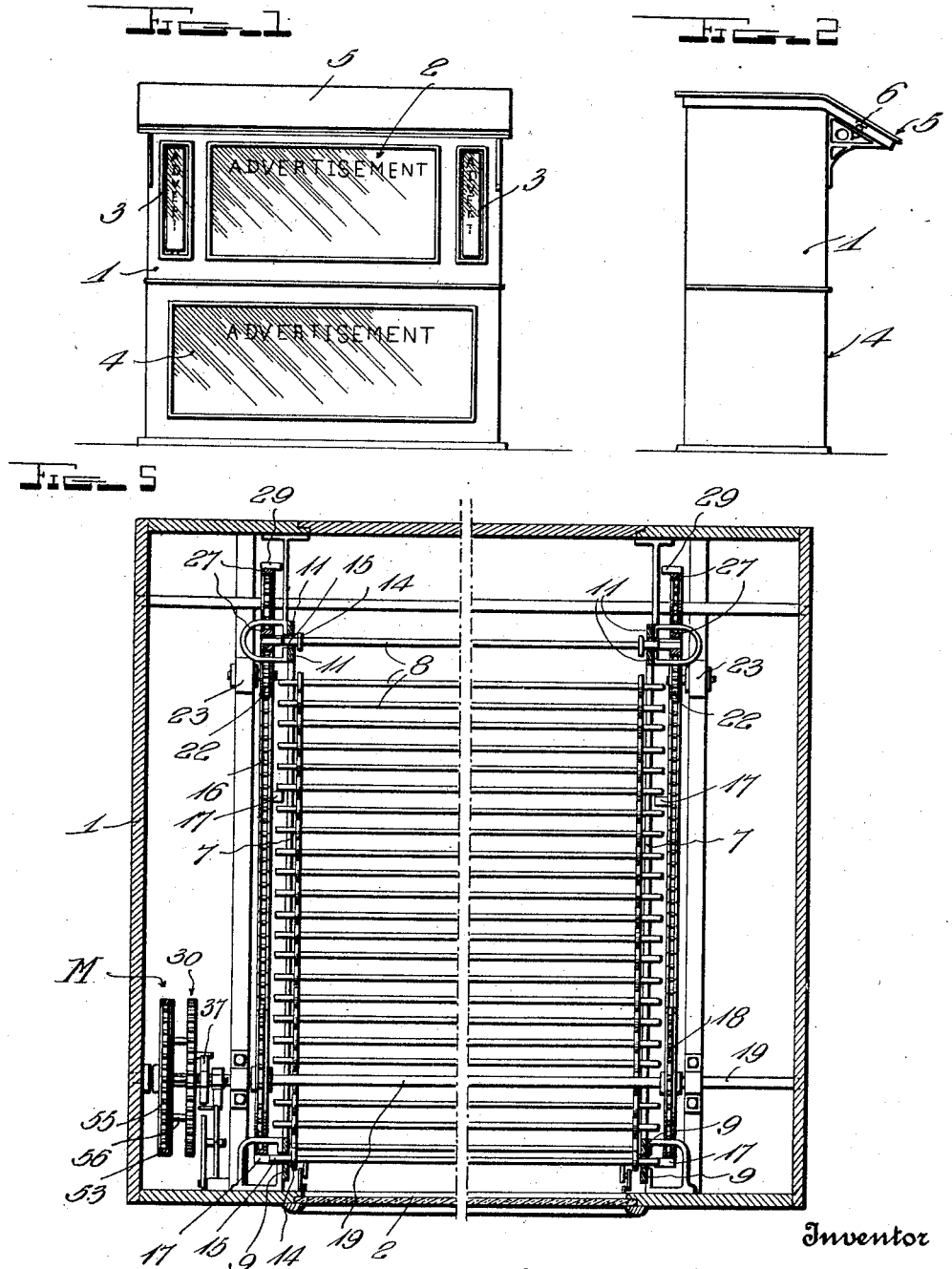

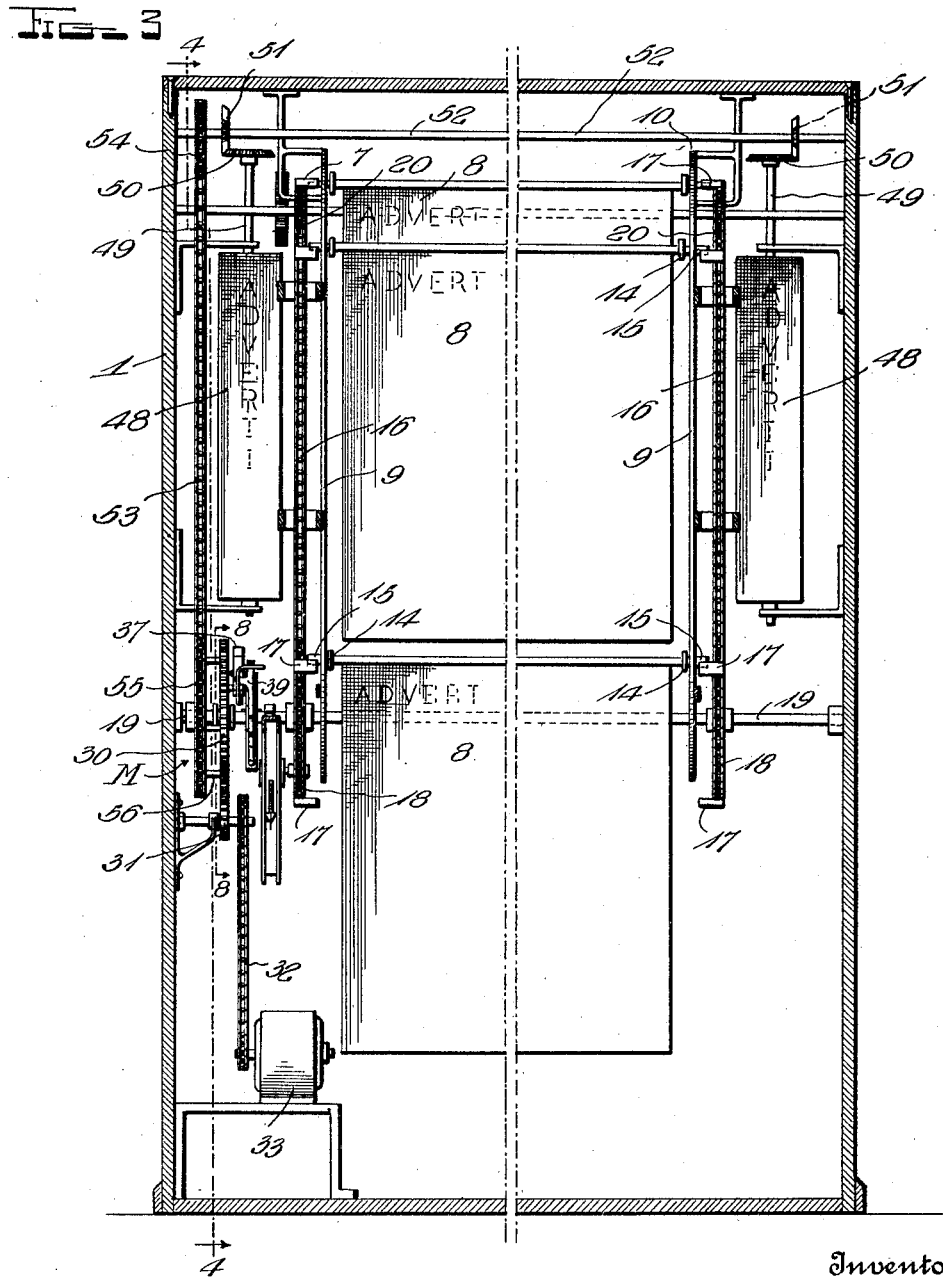

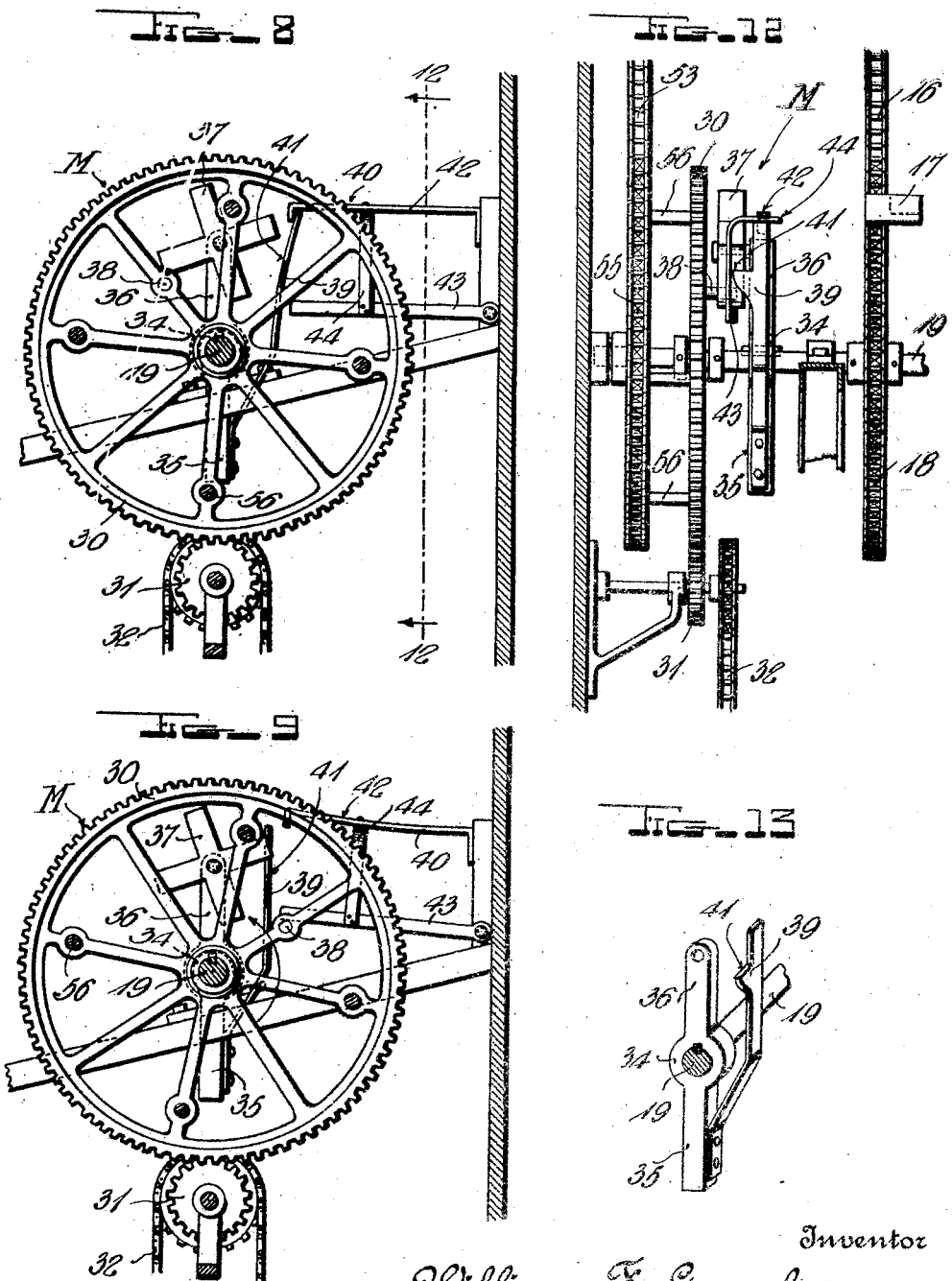

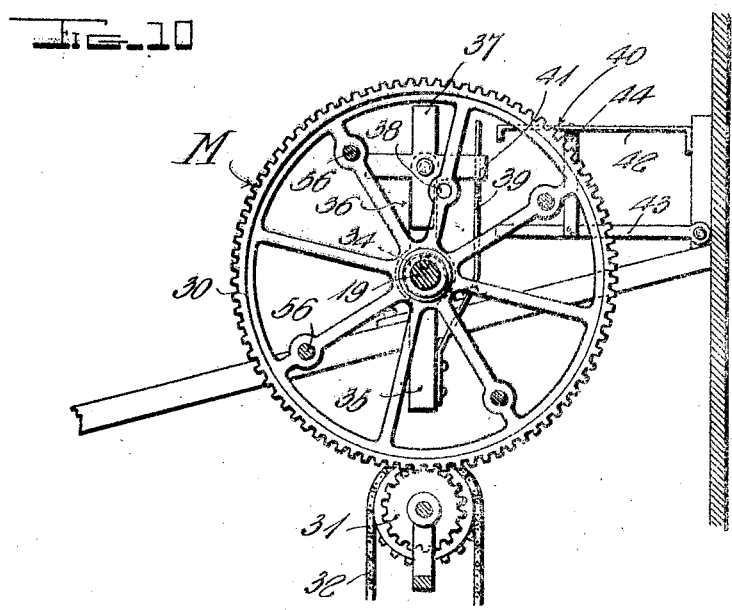
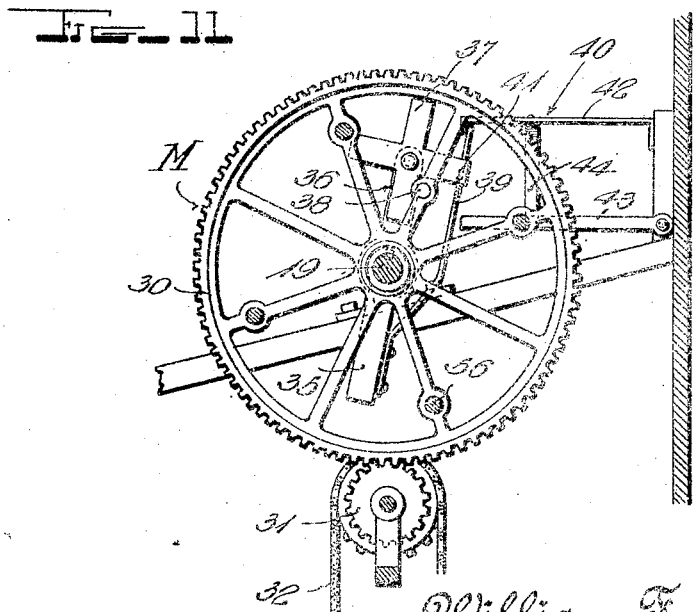

UNITED STATES PATENT OFFICE.

WILLIAM F. GREENLEE, OF ATCHISON, KANSAS.

DISPLAY DEVICE.

1,367,775.  Specification of Letters Patent.  Patented Feb. 8, 1921.

Application filed November 24, 1919. Serial No. 340,322.

*To all whom it may concern:*

Be it known that I, WILLIAM F. GREENLEE, a citizen of the United States, residing at Atchison, in the county of Atchison and State of Kansas, have invented certain new and useful Improvements in Display Devices; and I do declare the following to be a full, clear, and exact description of the invention, such as will enable others skilled in the art to which it appertains to make and use the same.

My invention relates to improvements in display devices for advertisements, merchandise, lecture charts, etc., and is designed to be placed upon vacant lots, in show windows, on the tops of buildings, upon street arches, in lecture, school and sales rooms, and in various other places and for a variety of purposes.

The invention relates more particularly to display devices of the type employing a cabinet having a view opening, and means for successively presenting panels containing different advertisements or the like, at said opening. I am aware that devices of this character have been heretofore devised, having endless intermittently driven chains carrying the advertising panels, but when this construction is used, the capacity of the machine is controlled by the length of the chains and the portions of such length occupied by the individual panels. The principal object of my invention however is to provide a novel arrangement of tracks for supporting any required number of panels, and to employ novel means for successively raising the panels from one end of said tracks, presenting them at said view opening, and then carrying them to and depositing them on the other ends of the tracks. I prefer to employ endless chains or belts for moving the display panels in the manner set forth and the capacity of the machine is not restricted to the length of such chains or belts as in devices of the type above referred to.

Another object of the invention is to provide other chains or belts coacting with those above mentioned for depositing the previously displayed panels on the tracks which support them when not on display.

A still further object is to provide novel means for intermittently driving the panel moving chains or belts, the arrangement being such as to permit continual rotation of a main driving wheel while causing intermittent turning of the sprockets or like wheels over which the chains or belts travel.

Yet another object is to provide a display device in which comparatively small advertisements or the like may be viewed simultaneously with the main display and in which the smaller displays are changed more often than the main panels, thus relieving the motony caused by a "dead" board, that is one in which all displays remain still for quite a length of time.

With the foregoing in view, the invention resides in the novel construction, combination and arrangement of parts hereinafter fully described and claimed, the descriptive matter being supplemented by the accompanying drawings.

Figure 1 is a front elevation of a display device constructed in accordance with my invention.

Fig. 2 is an end elevation.

Fig. 3 is a vertical longitudinal section cut immediately behind the front of the cabinet.

Fig. 4 is a vertical transverse section on the plane indicated by line 4—4 of Fig. 3.

Figs. 5 and 6 are horizontal sections on the planes indicated by the lines 5—5 and 6—6 of Fig. 4.

Fig. 7 is a detail sectional view showing the manner in which succeeding panels are prevented from interfering with each other.

Fig. 8 is an enlarged vertical section showing the intermittent driving mechanism, cut approximately on the line 8—8 of Fig. 3.

Figs. 9, 10 and 11 are views similar to Fig. 8 but showing different positions of parts.

Fig. 12 is a vertical section on the plane of line 12—12 of Fig. 8.

Fig. 13 is a detail perspective showing parts of the intermittent driving mechanism.

In the drawings above briefly described, the numeral 1 designates a suitably constructed cabinet having a relatively large view opening 2 and preferably two smaller openings 3 in its front, these openings being both provided with glass closures. Below the openings 2 and 3, I prefer to provide the cabinet with a space 4 for a fixed display. The front of the cabinet may well be provided with a cowl 5 carrying electric lights 6 and suitable reflectors for illuminating all matter on display at night.

Within the cabinet 1, are two spaced parallel tracks 7 which decline to points adjacent the lower edge of the opening 2, and on these tracks, a plurality of panels 8 are normally supported; and novel means are employed for successively raising the panels from the lower front ends of said tracks, presenting them one at a time at the view opening 2 for a predetermined length of time, and then carrying said panels to and depositing them upon the upper or rear ends of the tracks. During their travel, the panels are by preference guided by parallel vertical tracks 9 at the vertical edges of the opening 2, by parallel horizontal tracks 10 leading rearwardly from the upper ends of said tracks 9, and by spaced vertical tracks 11 depending from the rear ends of the tracks 10. The rearmost of the tracks 11 preferably curve gradually to the tracks 7, as seen at 12, while a rather abrupt angle 13 is formed between said tracks 7 and the foremost of the tracks 9. The upper ends of the panels 8 are provided with track engaging rollers 14 and with stubs 15 extending outwardly from said rollers, and it is by means of these stubs that any desired number of the panels 8 may be supported on the tracks 7 as illustrated fully in Fig. 4.

For moving the panels 8 from the rack or magazine formed by the tracks 7, properly presenting them at the opening 2, and again depositing them onto said rack or magazine, I employ a pair of intermittently driven belts 16 which are preferably in the form of sprocket chains, and said belts are provided with suitable seats 17 for the stubs 15, or with other adequate means for lifting the panels to proper position at the opening 2 and for moving said panels rearwardly along the tracks 10 for return to the tracks 7 by way of the vertical tracks 11. The belts 16 pass around two large sprockets 18 on a main longitudinal drive shaft 19 which is located adjacent the lower end of the opening 2. Other sprockets 20 and 21 are located at the front and rear ends of the tracks 10 for guiding the belts 16, and below the ends of the tracks 11, said belts are guided by other sprockets 22 which may well be provided with suitable means 23 for taking up slack. By means of intermeshing gears 24, one of the sprockets 21 drives a longitudinal shaft 25 having sprockets 26 immediately behind the sprockets 21. Vertically operating endless belts 27 are trained around the sprockets 26 and around other sprockets 28 near the lower ends of the tracks 11, and this belt, which is shown in the form of a chain carries means such as seats 29 to receive the stubs 15 as the panels 8 move from the horizontal tracks 10 between the tracks 11. Thus, since the belts 27 are driven with the belts 16, the panels are carefully lowered and deposited on the tracks 7. Operation of all belts is effected at intervals by mechanism M for intermittently driving the shaft 19. This mechanism is illustrated in a general way in Figs. 3, 4, 5 and 6 and is detailed in Figs. 8 to 13, to which views the following description refers more particularly.

A constantly rotating wheel 30 is loose upon the shaft 19 and may be driven by any preferred means. For illustrative purposes however I have shown said wheel in the form of a gear meshing with a pinion 31 driven by a chain 32 from an electric motor 33. A hub 34 is keyed or otherwise secured on the shaft 19 adjacent the wheel 30 and is provided with oppositely extending arms 35 and 36. Arm 36 carries a star wheel 37; wheel 30 carries a lateral pin or the like 38 coacting with said star wheel for connecting the wheel 30 with the arm 36 for rotating shaft 19, and arm 35 is provided with a catch 39 for holding the star wheel against turning while said star wheel and the pin 38 are acting to drive the shaft 19. A combined stop and latch 40 however is provided for releasing the catch 39 after each complete revolution of the shaft 19, permitting the star wheel 37 to turn and release the pin 38, thus disconnecting the wheel 30 from the shaft 19. Fig. 8 shows the position of parts immediately after releasing the catch 39, allowing the star wheel 37 to turn and release the pin 38; Fig. 9 discloses the manner in which the combined stop and latch 40 is released from the catch 39 when the wheel 30 has made almost a complete revolution from the position of Fig. 8, allowing said catch to again move to a position in which it will operate to hold the star wheel against rotation; Fig. 10 shows the star wheel 37 locked against turning by the catch 39 and illustrates the pin 38 in operative contact with said star wheel for turning arm 36 to drive the shaft 19; and Fig. 11 discloses the manner in which the catch 39 is released from the star wheel when the shaft 19 has been turned an approximately complete revolution from the position shown in Fig. 10.

By the arrangement shown and described, the shaft 19 will be rotated one revolution upon every other revolution of the wheel 30, and each time said shaft is turned, the previously displayed panel 8 is moved rearwardly along the tracks 10 and another panel is lifted into position at the opening 2. The panels are thus successively displayed and the intervals of change may be varied as desired by properly controlling the speed of the wheel 30.

The catch 39 above described is by preference in the form of a flat spring secured at one end to the arm 35 and provided near its other end with a shoulder 41 to engage the star wheel 37, and it is with said last named end of the catch that the stop and latch 40 coact. This stop and latch is preferably formed by laterally bending one end of a spring arm 42 whose other end is suitably mounted on any fixed support. To effect the release of the stop and latch 40, a pivoted arm 43 may well be provided, said arm being positioned in the path of the pin 38 and having a lateral extension 44 bearing against the arm 42. Pin 38 strikes arm 43 and thus releases the stop and latch 40 from the catch 39, immediately before rotation of the shaft 19 is to start, allowing said catch to right itself from the curved position of Fig. 8 to the position shown in Fig. 9. The last named figure illustrates the pin 38 in the act of releasing the member 40. A continued movement of this pin in the direction of the arrow turns the star wheel 37 to the limit allowed by the catch 39 as seen in Fig. 10, and the parts 30, 37, 36 and 19 are now rotatable together, with the effect that the shaft 19 is driven throughout one revolution. When the parts reach the position shown in Fig. 11, the spring catch 39 abuts the stop and latch 40 and while the arm 36 is moving from this position to the position shown in Fig. 8, said spring catch is sprung outwardly to release the star wheel 37. The catch 39 remains in the sprung position shown in Fig. 8 until the member 40 is again released, but the moment this release takes place, the resiliency of said spring catch restores the same to operative relation with the star wheel.

To prevent possible interference of the rearwardly moving, previously displayed panel, with the next panel moving upwardly to display position, I preferably employ the arrangement shown most clearly in Fig. 7. Arms 45 are loosely pivoted at 46 to the cabinet 1, adjacent the lower end of the opening 2, the rear ends of said arms being provided with rollers 47 of greater diameter than the existing space between the previously displayed panel and the one next to be presented. These rollers are partly receivable in the space in question and serve to direct the lower end of the previously displayed panel rearwardly out of the upward path of the next panel, as the latter is raised into position.

In connection with the features above described, I preferably employ more rapidly changing panels or displays 48 visible through the openings 3, and carried by vertical shafts 49 having beveled gears 50 at their upper ends. Mutilated gears 51 on a horizontal shaft 52 are employed for turning first one shaft 49 and then the other, and said shaft 52 is constantly driven by a sprocket chain 53 and sprockets 54 and 55. The sprocket 55 is loose upon shaft 19 but is attached to the wheel 30 by bolts or the like 56 as seen most clearly in Figs. 8 to 12. By the arrangement described, the displays 48 are changed much more rapidly than the panels 8 and thus there is no time at which the board is "dead" for any appreciable length of time.

Any suitable number of panels 8 may be supported on the magazine or rack formed by the tracks 7 and as the belts 16 are intermittently driven, the panels are lifted from the front ends of said tracks and presented at the opening 2 for a predetermined length of time, and upon the succeeding movements of said belts, the panels are carried rearwardly and then downwardly along the tracks 10 and 11, and redeposited upon the upper ends of the tracks 7, the belts 27 in the meantime preventing sudden dropping of the panels onto said tracks 7. The panels 8 are changed at every other revolution of the wheel 30, but through the connections above described, the displays 48 are much more frequently shifted.

The device is of comparatively simple and inexpensive nature, may be operated with practically no attention and will be efficient and durable in every way. I attach great importance to the inclined tracks 7 for normally supporting a plurality of panels, to the novel means employed for shifting the panels in the required manner and returning them to the tracks, to the novel intermittent driving mechanism for the panel changing means, and to the rapidly changing displays 48. All of these features may well be incorporated in the forms shown and described, but within the scope of the invention as claimed, the machine is subject to numerous changes as occasion may dictate.

I claim:

1. A display device comprising a cabinet having a view opening, panel supporting tracks in said cabinet with their front ends disposed adjacent the lower end of said opening, panels having supporting means at their upper ends resting on said tracks, means for lifting the individual panels from said tracks, displaying them at said opening and then carrying them rearwardly above the tracks and means co-acting with a portion of said panel lifting means for lowering the rearwardly carried panels gently onto the rear ends of said tracks.

2. A display device comprising a cabinet having a view opening, a pair of horizontally spaced tracks in said cabinet with their front ends positioned adjacent the lower end of said opening, vertical tracks rising from the front ends of said first named tracks, horizontal tracks extending rearwardly from the upper ends of said vertical tracks, additional vertical tracks depending from the rear ends of said horizontal tracks to said first named tracks, a plurality of panels having lateral stubs adapted to rest on said first named tracks, means for successively engaging said stubs and shifting said panels to raise them from said first named tracks, move them along said first named vertical tracks to present them at said opening, and for then moving said stubs and their panels rearwardly along said horizontal tracks into engagement with the upper ends of said additional vertical tracks, and an endless vertical belt having means for supporting said stubs and consequently lowering the panels along said additional vertical tracks.

3. A display device comprising a cabinet having a view opening, a pair of horizontally spaced tracks in said cabinet with their front ends positioned adjacent the lower end of said opening, vertical tracks rising from the front ends of said first named tracks, horizontal tracks extending rearwardly from the upper ends of said vertical tracks, additional vertical tracks depending from the rear ends of said horizontal tracks to said first named tracks, a plurality of panels having lateral stubs adapted to rest on said first named tracks, wheels at the corners of the trackage aforesaid, intermittently driven endless belts trained around said wheels and having means for lifting said stubs and their panels, for presenting the latter at said view opening and then moving them rearwardly along said horizontal tracks to the upper ends of said additional vertical tracks, and additional endless belts having downwardly moving reaches adjacent said additional vertical tracks and provided with means for supporting said stubs as they travel downwardly therein.

4. A display device comprising a cabinet having a horizontally elongated relatively large view opening occupying substantially the upper half of one of its vertical sides, said side also having relatively small vertically elongated view openings at the ends of said relatively large opening, changeable display means visible through said relatively large opening, additional changeable display means visible through said relatively small openings, and means for operating all of said changeable display means and for automaticaly changing the display means of said relatively small openings at more closely spaced intervals than the other display means.

5. A display device comprising a cabinet having a relatively large view opening and smaller vertically elongated openings at opposite sides of said relatively large opening, changeable display means visible through said large opening, vertically elongated changeable displays visible through said smaller openings, vertical shafts carrying said vertically elongated displays, gears on said shafts, multilated gears for mesh with said first named gears, and means for operating said multilated gears and said first named display means, and for changing said vertically elongated displays more frequently than the other display means.

6. In a display device, a cabinet having a view opening, a plurality of panels adapted for successive disposition at said opening, means for raising one panel to said opening, and means for simultaneously carrying the previously displayed panel upwardly and rearwardly; together with means for forcing the lower end of the previously displayed panel out of the path of the approaching panel.

7. In a display device, a cabinet having a view opening, a plurality of panels adapted for successive disposition at said opening, and means for raising one panel to said opening and for simultaneously carrying the previously displayed panel upwardly and rearwardly; together with arms loosely pivoted to the cabinet at their front ends, and rollers on the rear ends of said arms adapted for partial reception in the space between the previously displayed panel and the approaching panel, said rollers serving to force the lower end of said previously displayed panel rearwardly out of the path of the next panel.

In testimony whereof I have hereunto set my hand.

WILLIAM F. GREENLEE.